Feb. 11, 1936.  L. A. BONZAGNI ET AL  2,030,047
COMBINATION BROILER AND TOASTER
Filed May 17, 1934
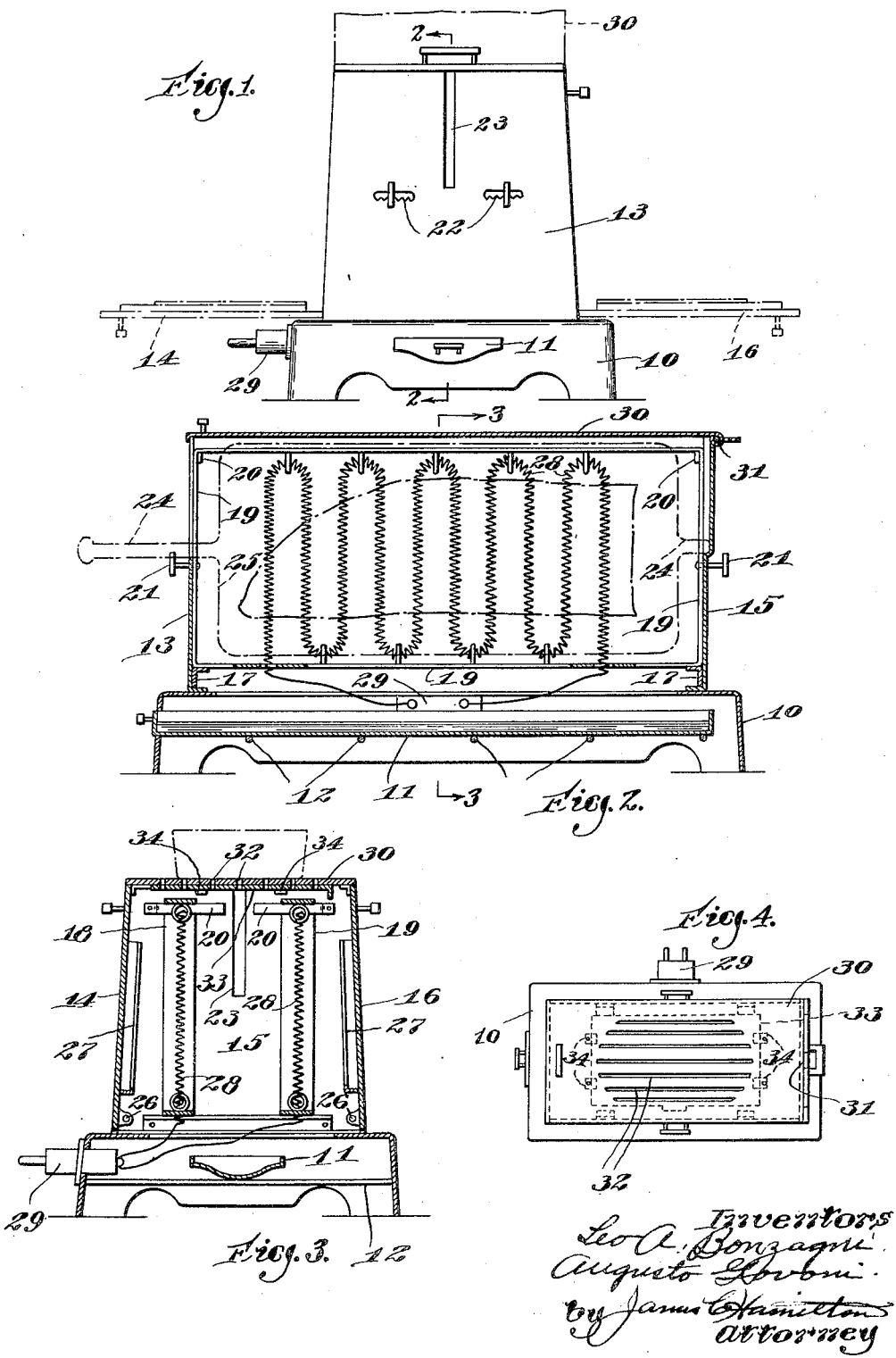

Patented Feb. 11, 1936

2,030,047

UNITED STATES PATENT OFFICE 2,030,047

COMBINATION BROILER AND TOASTER

Leo A. Bonzagni, Brookline, and Augusto Govoni, Somerville, Mass.

Application May 17, 1934, Serial No. 726,118

5 Claims. (Cl. 219—19)

Our present invention relates to broilers and toasters and more particularly to a combination broiler and toaster.

The principal object of our invention is an improved combination broiler and toaster;

Another object is an improved combination broiler and toaster in which the electrical heating coils are adjustable;

Another object is an improved electrical broiler and toaster from which the drippings from the broiled food may be collected and used;

Still another object is an improved electrical broiler and toaster which may be used for an electrical stove having provided a grilled top on which to place dishes, and Other objects and novel features comprising the construction and operation of our invention will appear as the description of the same progresses.

In the drawing illustrating the preferred embodiment of our invention:

Fig. 1 is an end elevation, the top cover and side toaster plates being shown open in dot and dash lines;

Fig. 2 is a longitudinal vertical cross-section taken on the line 2—2 of Fig. 1;

Fig. 3 is a transverse vertical cross-section taken on the line 3—3 of Fig. 2, and Fig. 4 is a plan view of the apparatus, the scale being somewhat reduced over that shown in Figs. 1, 2, and 3 for convenience.

Referring more in detail to the drawing, 10 indicates a base in which is mounted a removable drip pan 11. The drip pan 11 is adapted to rest upon cross support rods 12 which are transversally located in the base 10, the pan 11 being entered through an opening in the front end of the base 10.

Attached to the base 10 are the side walls of the combination broiler and toaster as indicated at 13, 14, 15 and 16. Attached to either end side wall 13 and 15 are channel members 17 upon which rests the heating coil frames 18 and 19, the upper portion of said frames being supported by guide members 20. At the front and rear central portion of the vertical portions of the heating coil frames are provided handle portions 21, and in the end wall 13 and 15 we have provided saw toothed openings 22, better shown in Fig. 1 such that the heating coils may be adjusted toward or away from the center of the broiler. At the center portion of the end walls 13 and 15 we have provided a slotted opening 23 for the purpose of receiving the end portions 24 of a broiler grill 25. It will be observed that the drip pan 11 is located just below this broiler grill so that all juices which are broiled from a steak, for instance, are preserved.

The side walls 14 and 16 are provided with hinges 26 at their lower portions and handles 27 at their top portions such that the sides 14 and 16 may be opened as shown in Fig. 1, in dot and dash lines. On the inner side of the sides 14 and 16 we have provided guide members 27 in which slices of bread may be placed for toasting, either separately or at the time the broiler is in operation.

The heating coils are of the conventional type and are directly connected with a terminal member 29 located in the side of the base 10.

The top 30 of the combination broiler and toaster is hinged at 31 for the purpose of lifting out of the way when it is desired to use the broiler grill 25. The top 30 is further provided with grill openings 32 which may be closed at will by means of the slide 33 located on the under side and adapted to slide transversally on the guide straps 34.

The top 30 may be used to heat water or boil food or other similar operations while toast is being made on the two sides 14 and 16 and meat being broiled in the central part of the broiler. At the same time the meat may be broiled slow or fast as desired by varying the setting of the coil frames 18 and 19, or one side of the meat may be broiled more than the other.

Wherein we have shown our invention somewhat in detail in our preferred embodiment yet it should be understood that we may vary the proportions and construction within considerable latitude without departing from the spirit of the invention.

Having thus described our invention what we claim as new is:

1. A combination broiler, toaster and heater comprising in combination, a base, end frames attached to said base, pivoted toaster side frames attached to said end frames, heater coils mounted on transversally adjustable frames, said coil frames being transversally slidable on said end frames, a grill top hinged on one of said end frames, and a broiler grid slot located in the upper portion of each of said end frames.

2. A combination broiler, toaster and heater comprising in combination, a base, end frames attached to said base, a drip pan located in said base, pivoted toaster side frames attached to said end frames, heater coils mounted on transversally adjustable frames, said coil frames being transversally slidable on said end frames, a grill top hinged on one of said end frames, and a broiler grill grid slot located in the upper portion of each of said end frames.

3. A combination broiler, toaster and heater comprising in combination, a base, end frames attached to said base, a drip pan located in said base, transversally adjustable heater coils mounted on frames slidably attached to said end frames, a grill top member hinged to one of said end frames, broiler grid slots located in the upper portion of said end frames, grill openings located in said hinged top member, and a slide located on the under side of said top being adapted to open and close said grill opening in said top.

4. A combination broiler, toaster and heater comprising in combination, a base, end frames attached to the top of said base, a drip pan located in said base, heater coils mounted in frames, said frames being transversally slidable in mountings attached to said end frames, broiler grid slots located in the upper portion of said end frames, grill openings located in a hinged top member, and a slide located on the under side of said top being adapted to open and close said grid openings in said top.

5. A combination broiler, toaster and heater comprising in combination, a base, end frames attached to the top of said base, a drip pan located in said base, transverse rods located in said base adapted to support said drip pan, side toaster frames pivoted to said end frames, heater coils mounted within frames, said heater coil frames being transversally slidable in brackets mounted on said end frames, vertical slots located in the upper portion of said end frames for the purpose of receiving a broiler grid, a top member hinged to the top of one of said end frames, openings located in the said top, and a slide located on the under side of said top for the purpose of opening and closing said openings in said top.

LEO A. BONZAGNI.
AUGUSTO GOVONI.